(12) United States Patent
Abdo

(10) Patent No.: US 8,194,977 B2
(45) Date of Patent: Jun. 5, 2012

(54) REMOTE DESKTOP PROTOCOL COMPRESSION ACCELERATION USING SINGLE INSTRUCTION, MULTIPLE DISPATCH INSTRUCTIONS

(75) Inventor: Nadim Y. Abdo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 12/331,170

(22) Filed: Dec. 9, 2008

(65) Prior Publication Data

US 2010/0142813 A1 Jun. 10, 2010

(51) Int. Cl.
*G06K 9/00* (2006.01)
*G06K 9/36* (2006.01)
(52) U.S. Cl. ..................................................... 382/166
(58) Field of Classification Search .................. 382/162, 382/164, 166, 173, 232, 244–246, 250, 276, 382/277, 294, 303; 345/426, 505, 506, 522, 345/600–604, 611; 712/22, 204, 225; 375/240.11; 708/402, 405, 409; 341/67
See application file for complete search history.

(56) References Cited

U.S. PATENT DOCUMENTS

| | | | |
|---|---|---|---|
| 6,148,111 A | | 11/2000 | Creusere |
| 6,172,626 B1 * | | 1/2001 | McDonnell et al. ............ 341/67 |
| 6,788,303 B2 * | | 9/2004 | Baldwin ....................... 345/522 |
| 7,171,444 B2 | | 1/2007 | Deshpande |
| 7,174,047 B2 * | | 2/2007 | Lin et al. ........................ 382/250 |
| 7,187,383 B2 * | | 3/2007 | Kent ............................... 345/505 |
| 7,227,556 B2 * | | 6/2007 | O'Driscoll .................... 345/611 |
| 2006/0083432 A1 | | 4/2006 | Malvar |
| 2006/0203007 A1 | | 9/2006 | Bullard et al. |
| 2007/0250683 A1 | | 10/2007 | Van Hook et al. |
| 2008/0005236 A1 | | 1/2008 | Schmieder |
| 2008/0193050 A1 * | | 8/2008 | Weybrew ....................... 382/303 |
| 2008/0228933 A1 | | 9/2008 | Plamondon |
| 2010/0142813 A1 * | | 6/2010 | Abdo ............................ 382/166 |

FOREIGN PATENT DOCUMENTS

KR 10-2005-0090264 A 9/2005

OTHER PUBLICATIONS

"Remote Desktop Protocol (RDP)—Technical Analysis," http://www.itraction.nl/nl/working-online-met-itraction-oplossingen/rdp.html, downloaded 2008, 1-7.

Xu et al., "Optimizing the Performance of a Windows Network Projector," http://msdn.rnicrosoft.com/en-us/library/bb931330.aspx, Jul. 2008, 1-7.

(Continued)

*Primary Examiner* — Amir Alavi
(74) *Attorney, Agent, or Firm* — Woodcock Washburn LLP

(57) ABSTRACT

Techniques are disclosed for compressing image data using the parallel instructions available on a vector processor. In an embodiment, a source image in RGBA format is received. A series of vector processor instructions are used to perform parallel processing steps of splitting the image into separate R, G, B, and A channels, then converting it into a YCoCg colorspace, compressing the Y, Co, and Cg channels separately, then saving an output image corresponding to a compressed version of the source image.

20 Claims, 3 Drawing Sheets

OTHER PUBLICATIONS

Madden, B., "Remote Display Protocols for VDI: will RDP Be Enough?" http://www.brianmadden.com/content/article/Remote-display-protocols-for-VDI-will-RDP-and-ICA-be-enough, Nov. 5, 2007, 1-9.

Sommers, F., "The Desktop as a Grid Service," http://www.ieeetcsc. "Windows Vista SP1," http://tech-buzz.net/2008/03/18/download-windows-vista-sp1/, Mar. 18, 2008, 1-7. org/newsletters/2006-01/desktop_grid.html, downloaded 2008, 1-9.

Wong et al., "Operating System Support for Multi-User, Remote, Graphical Interaction," ftp://ftp.deas.harvard.edu/techreports/tr-14-99.ps.gz, downloaded 2008, 1-13.

PCT Application No. PCT/US2009/064036 : International Search Report of the International Searching Authority, Jun. 18, 2010, 3 pages.

* cited by examiner ial Application No. 60/776,648 entitled the same and filed
REMOTE DESKTOP PROTOCOL COMPRESSION ACCELERATION USING SINGLE INSTRUCTION, MULTIPLE DISPATCH INSTRUCTIONS

CROSS-REFERENCE TO RELATED APPLICATIONS

This application is related by subject matter to U.S. Non-provisional Application No. 2007/0195369, entitled "Pre-Processing of Image Data for Enhanced Compression" and filed on Aug. 31, 2006, which claims priority to U.S. Provisional Application No. 60/776,648 entitled the same and filed Feb. 23, 2006, and which is incorporated herein by reference.

BACKGROUND OF THE INVENTION

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is operating as part of a LAN, when in reality the client device is only sent screenshots of the applications as they appear on the server side.

Because bitmaps are expensive in terms of bandwidth consumption when transmitted over a network connection (e.g., Internet), rather than sending the entire bitmaps most virtual systems nowadays send graphic primitives and other operations, which tell a sub-routine on the client side what and how to draw something. For example, a client may be told to draw a rectangle along with information about where it should be drawn, what size, color, etc. For instance, a rectangle may be used to draw a button for a user interface, a border around a document, or any other purpose for which a rectangular shape may be useful. Of course, there are many other shapes and operations that can be used as primitives that may be more sophisticated and require more processing that must be done to transfer and perform the operation on the remote client.

As applications continue to get more sophisticated graphical user interfaces, the more processing intensive the use of the above primitives becomes. For example, bitmap images have been expanded to include an Alpha channel, which essentially indicates a desired level of transparency associated with each pixel. This transparency level instructs the client how to blend each pixel of the bitmap with the color that was already present where the bitmap is being displayed. An even better example of the expense associated with processing sophisticated primitive updates may be animation objects or elements, where a sequence of commands must instruct the client on how to draw the animation at each stage of the animation. When sequences of primitives are too complex, it may sometimes make more sense to send a bitmap representation that can more simply be displayed, rather than the potentially long sequence of other more complicated primitive operations. As previously mentioned, however, it may be too expensive to continually send full bitmap representations of the screen because of the limitations of most bit stream compressors together with limited network bandwidth.

There exist a class of processors known as vector processors that have single instruction, multiple data (SIMD) instructions in their instruction set architecture (ISA). Streaming SIMD extensions (SSE) such as the SSE 4.2 instructions in some INTEL™ x86 ISA processors, like the NEHALEM™ processor are a form of these SIMD instructions. These processors are able to speed up processing of certain types of data because they can operate on a large chunk of data at once. For instance, where an image is being processed, instead of operating on a single pixel at a time, a SIMD processor may operate on several pixels in parallel with a single instruction. Not only does this improve the performance of processing the instruction itself, but it may decrease the time spent fetching data from memory.

While SIMD instructions offer opportunities for improving the performance of some types of processes, such as processing image data for compression, the algorithms and techniques required to implement the process are considerably more difficult than with a non-vector processor. Special attention must be paid to data flow, and to organizing data in such a manner that it may be operated on in parallel. To that end, there would be a benefit from new techniques to increase the parallelism in operations on image data.

SUMMARY OF THE INVENTION

An embodiment of the present invention comprises a method that compresses an image on a vector processor. Using a series of operations that operate on 64 bits with a single instruction, he method takes a red-green-blue-alpha (RBGA) source image where each pixel comprises 8-bits each for the R, G, B, and A information. It 16-bit aligns each channel, then planarizes the source image to produce separate R, G, and B vectors. Then, each vector is unpacked, interspersing 8 zeros before each 8-bit value for a pixel. It takes these unpacked vectors and converts them from RGB color-space to a luminance-orange-green (YCoCg) color space, comprising Y, Co and Cg vectors. It then uses lossy compression on the Co and Cg vectors, then run-length encodes each vector and finally stores an output image corresponding to a compressed version of the source image.

Systems, methods, and computer readable storage media that perform the above and similar processes are disclosed.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
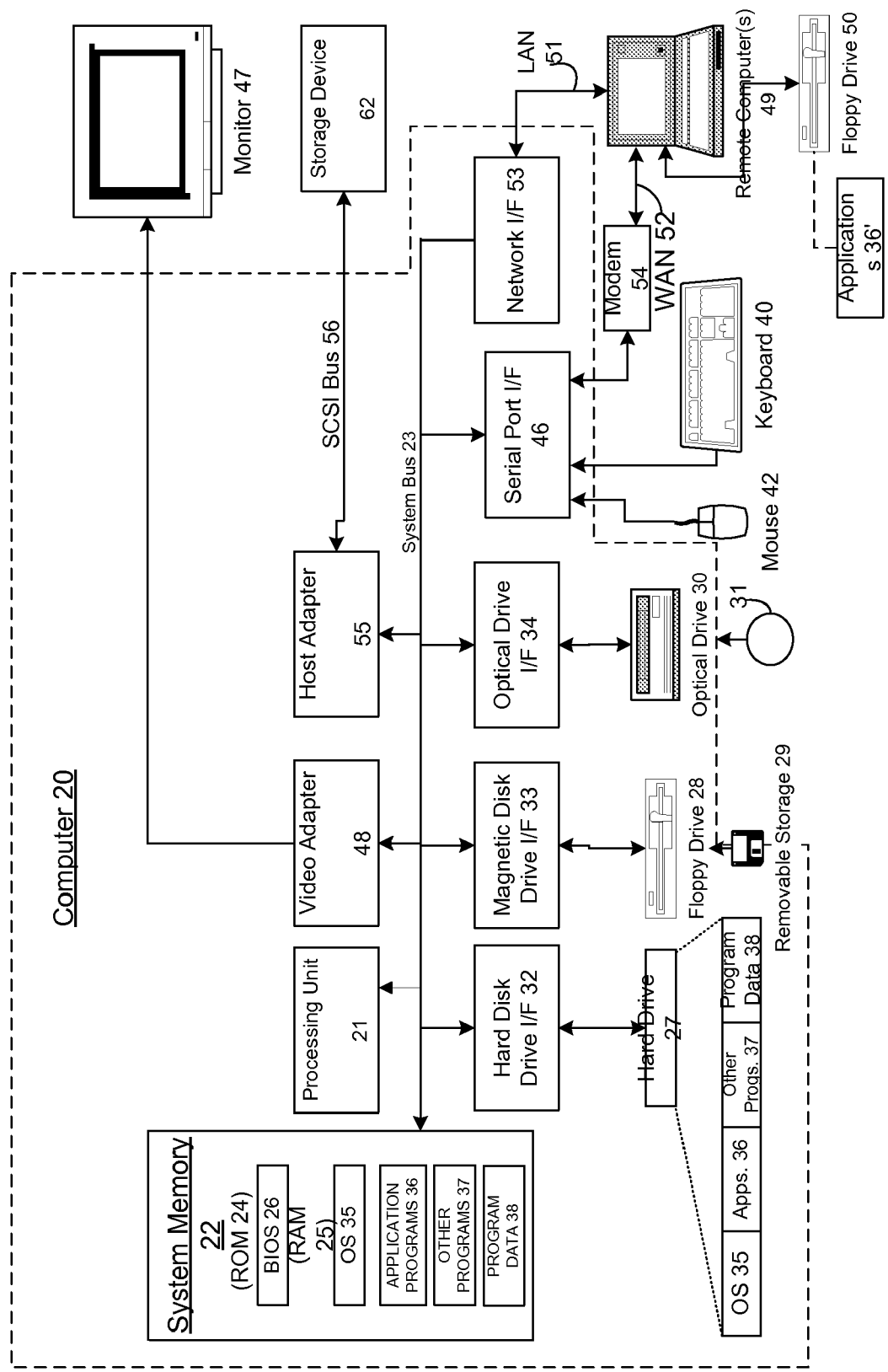
FIG. 1 depicts an example computer system wherein aspects of the present disclosure can be implemented.

Embodiments herein provide for a pre-processing stage or mechanism for enhancing data compression of an image by splitting or separating the color channels for pixels into planar data sources. Typically, image data is displayed as an interleaved set of channel types for a color space such that each pixel within an image (such as a bitmap) has one component for each color channel. For example, a pixel that has the color space of red, green and blue (RGB) will have one color channel for red, one channel for green, and one channel for blue. Accordingly, exemplary embodiments separate the components for each channel into planar data sources such that like components are shown within the same plane. By separating the interleaved bitmap or digital image into a planar representation each plane can be compressed independently and often times achieve higher compression ratios. This is especially true for channels that are expected to stay fairly constant throughout the bitmap most of the time (e.g., an Alpha channel that describes the transparency of elements within a bitmap).

In other words, exemplary embodiments take advantage of the fact that often times one channel can be going through transitions while others are held fairly constant. The utilization of the above embodiment can be further enhanced through manipulation of channel data or through converting the color space to something other than just RGB. For example, other color spaces that define a pixel in terms of illumination and chrominance (e.g., YUV, YCoCg, etc.) typically describe a color space more in terms of how a human eye perceives colors. In other words, these types of color spaces separate color components that an eye is more sensitive to from those channels that the eye is less sensitive. Accordingly, by taking advantage of the perceptual differences of human eyes, it is possible to degrade the information within a color channel to enhance patterns that compression models can more efficiently handle, yet allowing the image to remain perceptually lossless.

As described herein, there may be several ways of allowing color information for a particular color space or digital image to be modified in order to enhance compression ratios. For example, the chrominance channels of a particular color scheme may be quantized by reducing the overall bit count associated with the particular channel, thereby reducing the fidelity of the color palette but not necessarily the range of the color scheme. Alternatively, or in conjunction, a sample pixel space or sub-sampling of various chrominance values can be modified to some average of the overall values, and or other similar modifications to bring the values to a common denominator. As will be described in greater deal below, there may be other mechanisms for modifying data to enhance pattern recognition when pre-processing image data for compression.

Once the digital image or bitmap has been split into logically separate digital images, i.e., one for each plane of channel info, and once all manipulation or modification of the data has been made, exemplary embodiments can encode the values using standard or well known encoding modules such as a two-dimensional run length encoding scheme. Each scan line of the bitmap may be treated as a difference from the scan line that precedes it and then those differences can be encoded as described in greater detail below.

Embodiments of the present disclosure may execute on one or more computers. FIG. 1 and the following discussion are intended to provide a brief general description of a suitable computing environment in which the disclosure may be implemented. One skilled in the art can appreciate that some or all of the components of the computer system of FIG. 1 can be used to effectuate the computers of FIGS. 3 and 4.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Figure 2:
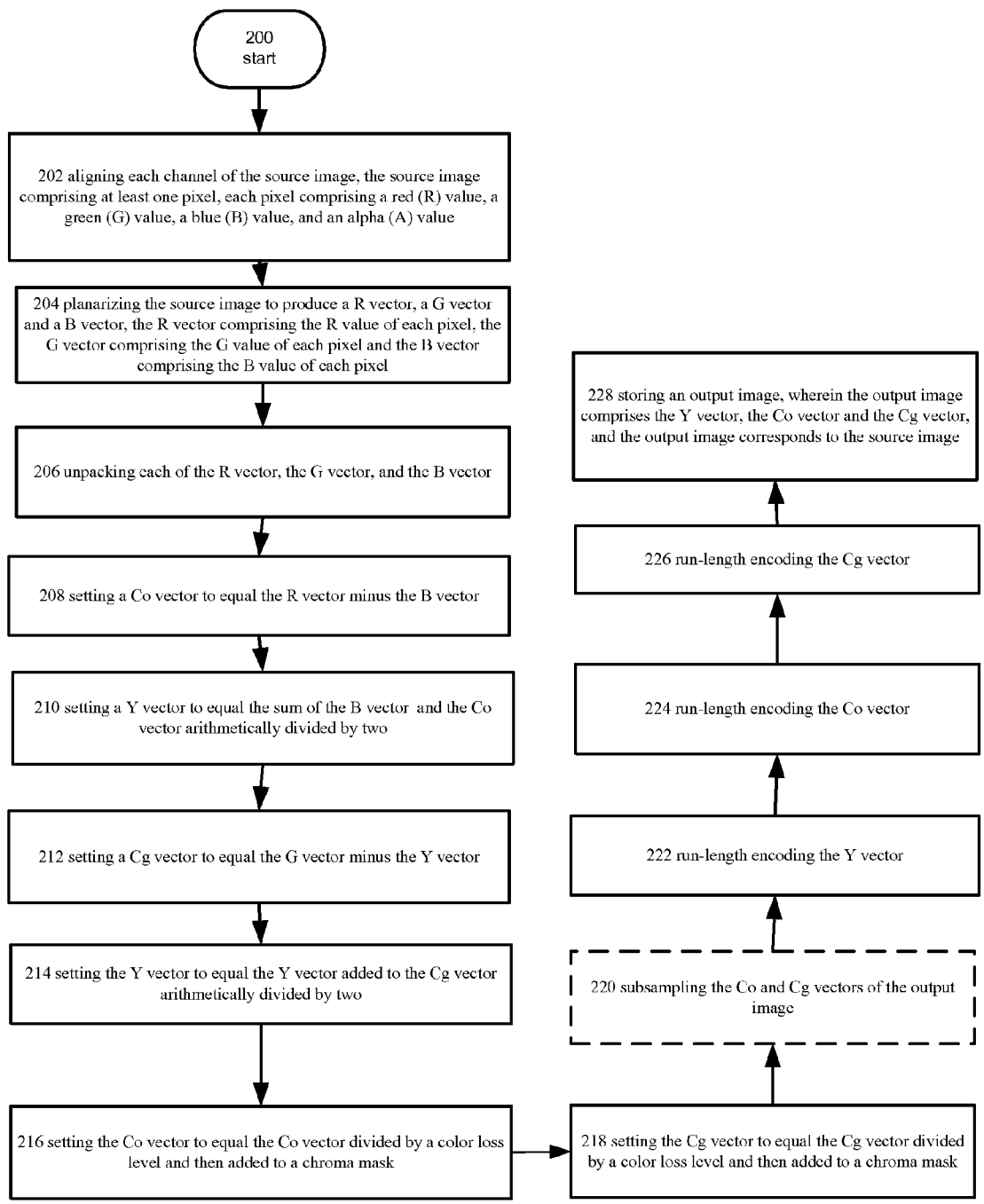
FIG. 2 depicts example operating procedures for the present disclosure.

FIG. 2 depicts example operating procedures for compressing a source image on a processor comprising a single instruction, multiple data (SIMD) instruction set. A processor with a SIMD instruction set is commonly known as a vector processor. Streaming SIMD extensions (SSE) such as the SSE 4.2 instructions in some INTEL™ x86 ISA processors, like the NEHALEM™ processor are a form of these SIMD instructions. Such a processor may operate upon a large portion of data at once in a parallel fashion. For instance, such a 64-bit processor may sum two sets of 32-bit signed integers simultaneously by placing two integers in each of two 64-bit words, and then adding each 64-bit word. Where there is normally overflow from the low word to the high word, such as if each low word contains $2^{\wedge}31$, the instructions commonly account for this and do not overflow to the high word. Such operational procedures may be used to compress an image for sending over a network, such as via a remote desktop protocol (RDP). In such an embodiment, the source image and output image may correspond to a displayed user session, such as a user would experience if locally at the computer on which the operating procedures are executed. That displayed user session may comprise the computer desktop as well as any open application windows tiled in such a manner as the user would see if at that computer.

In an embodiment, the source image comprises rows and columns of pixels, and each pixel comprises 32 bits in RGBA color space, such that 8 bits are devoted to each of the red (R) color value for the pixel, the green (G) color value, the blue (B) color value and the alpha (A) (or transparency) value.

Operation 200 begins the method. It may be executed, for instance, upon receiving a source image along with an instruction to compress that image.

Operation 202 depicts 16-bit aligning each channel of the source image, the source image comprising at least one pixel, each pixel comprising a red (R) value, a green (G) value, a blue (B) value, and an alpha (A) value. This comprises ensuring that the location in memory of the source image is in an address that is a multiple of 16-bites, and then all pixels, being 8 bits are then 8-bit aligned in memory space.

Operation 204 depicts planarizing the source image to produce a R vector, a G vector and a B vector, the R vector comprising the R value of each pixel, the G vector comprising the G value of each pixel and the B vector comprising the B value of each pixel; Where a color value of a pixel is expressed such that the red value of the first pixel is R(1), the source image of n pixels may originally be thought to have the form R(1)G(1)B(1)A(1) R(2)G(2)B(2)A(2) . . . R(n)G(n)B(n)A (n). In planarizing the source image, those color components of each pixel are re-arranged to the form R(1)R(2) . . . R(n), G(1)G(2) . . . G(n), B(1)B(2) . . . B(n), A(1)A(2) . . . A(n). An efficient algorithm for producing this rearrangement is to load the first 128 bits of the image, comprising four 32-bit pixels. Then, add to a R buffer the first, fifth, ninth and $13^{th}$ sections of 8-bits, to the G buffer the second, sixth, 10th and $14^{th}$, and to the B buffer the third, seventh, $11^{th}$, and $15^{th}$. Then, repeat the processes for each successive 128 bits of the image. In an embodiment, the A channel is neither planarized nor used later, but discarded in the interest of saving computational time and compressing the image.

Operation 206 depicts unpacking each of the R vector, the G vector, and the B vector, such that a sequence of eight zeros is placed before each eight bits of a vector. In the embodiment where each channel of a pixel comprises eight bits, this increases the effective space that each pixel occupies by a factor of two as well as increases the entire vector size by a factor of two. Where the R vector is represented as R(0), R(1), ... R(n) and a string of eight zeros is represented as 0x00, the unpacked vector is 0x00, R(0), 0x00, R(1), ... 0x00, R(n), with those zeros preceding each pixel's red value.

Operation 208 depicts setting a Co vector to equal the R vector minus the B vector. In an embodiment, this is performed on 128-bits of the R vector and B vector at a time. This comprises loading 128-bits of the R vector and the B vector at a time and subtracting the B vector from the R vector with a single instruction to the processor that may operate on 128-bits of data at a time. Where the vectors have been unpacked with zeros, each 128-bits comprises 8 bit channel values for a total of 64 bits, and 8 groups of 8 zeros for a total of another 64 bits. Because the vectors have been unpacked with intervening zeros, there is no concern of overflow—any overflow will flow into the that set of 8 zeros, and not the next number. For instance, the where the packed values may be 0x11 and 0x1F and they are summed, the result is 0x30. However, the unpacked version of those values are 0x0101 and 0x010F and the result is 0x0210. The overflow from the right 8-bits goes into the zeros, rather than into the left 8 bits of actual data. Similar logic applies to the other operations in this method, particularly operations 210-214.

Operation 210 depicts setting a Y vector to equal the sum of the B vector and the Co vector arithmetically shifted once to the right then summed with the Cg vector arithmetically shifted once to the right. In pseudo-code, this operation may be expressed as $Y=B+(Co>>1)$. In an embodiment, a single processor instruction is used to shift Co and save it to a temporary value, then a second single processor instruction is used to set Y to the sum of B and that temporary value. In an embodiment, this is performed on 128-bits of each vector at a time. Where Co equals 0x1111 1111 1111 1101, where it is bit shifted once to the right, each bit is moved into the place to the right, the rightmost bit is discarded, and then the second from the leftmost bit is assigned the value zero (the leftmost bit is used to signify whether the number is positive or negative, and is preserved). This produces 0x1011 1111 1111 1110.

Operation 212 depicts setting a Cg vector to equal the Y vector minus the G vector. In an embodiment, this is performed on 128-bits of each vector at a time.

Operation 214 depicts setting the Y vector to equal the Y vector added to the Cg vector arithmetically shifted once to the right. In an embodiment, this is performed on 128-bits of each vector at a time. In pseudo-code, this operation may be expressed as $Y=Y+(Cg>>1)$.

In an embodiment where 128 bits of the vectors are operated on at a time, the method then repeats operations 208-214 for the next successive 128-bits of each vector until all of each vector have been manipulated in this manner. In an embodiment where these operations are looped to operate over all of the image, the instructions appear twice within each loop. This is advantageous where 128 bits of a planarized vector are loaded into memory with a single operation. The first 64 bits are unpacked and then operated on, and then the second 64 bits may be unpacked and operated on without an additional memory access. When all 128 bits are operated upon, another memory access is required and the loop begins again.

Operation 216 depicts setting the Co vector to equal the Co vector divided by a color loss level and then added to a chroma mask. In an embodiment, the color loss level is a pre-determined number of bits to shift each 16-bit piece of the Co vector to the right (preserving sign, as above, where the value is signed) that corresponds to an amount to compress the image. This reduces the accuracy of the color information somewhat (the least significant bits are discarded), but also increases the amount that the image may ultimately be compressed by since more pixels will have the same color values (increasing the effectiveness of run-length encoding algorithms). Likewise, the chroma mask represents a set of 128 ones where every 16 bits are bitwise shifted to the right by the chroma loss level. In summing with the chroma mask level, a first level of compression is performed.

Operation 218 depicts setting the Cg vector to equal the Cg vector divided by a color loss level and then added to a chroma mask. In an embodiment, the color loss level is a pre-determined number of bits to shift each 16-bit piece of the Co vector to the right (preserving sign, as above, where the value is signed). This reduces the accuracy of the color information somewhat (the least significant bits are discarded), but also increases the amount that the image may ultimately be compressed by since more pixels will have the same color values (increasing the effectiveness of run-length encoding algorithms). Likewise, the chroma mask represents a set of 128 ones where every 16 bits are bitwise shifted to the right by the chroma loss level. In summing with the chroma mask level, a first level of compression is performed. In an embodiment, the chroma mask comprises a sequence of binary ones equal to the number of bits that the processor may operate on simultaneously, arithmetically bit shifted to the right by the color loss level in groups of bits that correspond to twice a number of bits in a pixel's red value.

Operation 220 depicts the optional step of subsampling the Co and Cg vectors. This may be accomplished, for instance, by taking the average of the color value of several adjacent pixels and assigning that average to each pixel's color value. This would then allow a compression algorithm to further reduce the storage space of the resulting output image, since many values would be repeated. More detail is given an embodiment of this operation in the discussion of FIG. 3.

Operation 222 depicts run-length encoding the Y vector. In an embodiment, the Y vector is not compressed as the other two vectors are in operations 216 and 218. This is because the human eye is most sensitive to the luminance represented by the Y vector, so in preserving this information, people will find the lossy compression on the other two channels to be less noticeable. Run-length encoding is a lossless compression scheme that comprises compressing the vector by storing consecutive data values that share the same value a single time, along with a count of how many data values are represented by that number. For instance, given a string of letters, AAAAAAABBBBAAAAA, the run length encoded version of this string may be expressed as (A7)(B3)(A5). In an embodiment, this run-length encoding is performed in accordance with a Lempel-Ziv (LZ) algorithm. A LZ algorithm typically operates by searching for matches between the object to be compressed and a set of strings contained in a data structure (often called a dictionary) maintained by the algorithm. When the algorithm finds a match, it substitutes a reference to the match's location in the data structure for the match itself. In an embodiment, other run length encoding techniques can be used that perform forward search looking for repeated runs and replacing them with codes indicating the length of the run and the byte pattern that is repeated. In an embodiment, a two-dimensional run length encoding technique is used to increase compression efficiency. This is achieved by exlusive-or'ing (XOR'ing) the current pixel row with the previous pixel row to achieve "vertical" strips of zeros where there is vertical repetition that can then be more easily run length encoded.

Operation 224 depicts run-length encoding the Co vector. This form of encoding works best on images that use only a few different types of colors (even very subtle changes in tone or hue require additional storage space in run-length encoding), so the technique benefits from the chroma loss levels applied to the vector above.

Operation 226 depicts run-length encoding the Cg vector. This may be performed in a manner similar to operations 222 or 224.

Operation 228 depicts storing an output image, wherein the output image comprises the Y vector, the Co vector and the Cg vector, and the output image corresponds to the source image. In an embodiment, this comprises de-planarizing the YCoCg image. In an embodiment, storage comprises storage to memory such as RAM and then transmission of the image over a computer network according to a remote desktop protocol (RDP) for use by a client.

Figure 3:
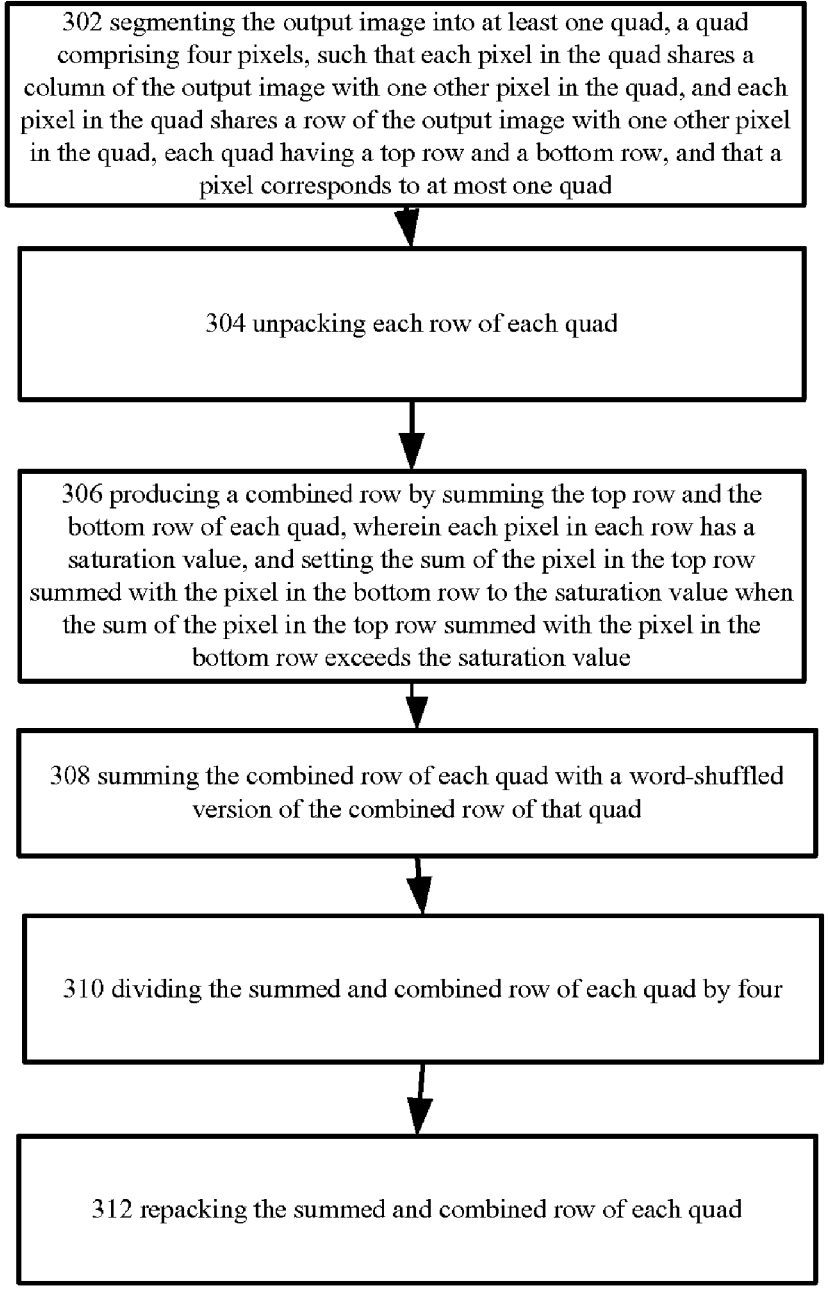
FIG. 3 depicts operational procedures for subsampling an output image as produced by the operational procedures of FIG. 2.

FIG. 3 depicts operational procedures for subsampling an output image as produced by the operational procedures of FIG. 2. It may be an embodiment of operation 220 of FIG. 2.

Operation 302 depicts the step of segmenting the output image into at least one quad, a quad comprising four pixels, such that each pixel in the quad shares a column of the output image with one other pixel in the quad, and each pixel in the quad shares a row of the output image with one other pixel in the quad, each quad having a top row and a bottom row, and that a pixel corresponds to at most one quad. In this embodiment, further compression is generated by subsampling the image and may be performed prior to run-length encoding to Co and Cg vectors to pre-process the image for better compression. These operations increase the uniformity of color values represented by the pixels (at a loss of image fidelity) and that allows for an increase of compression using run-length encoding.

Operation 304 depicts the step of unpacking each row of each quad to 16-bit values and interspersing each row with zeros. In the embodiment where each channel of a pixel comprises eight bits, this increases the effective space that each pixel occupies by a factor of two as well as increases the entire vector size by a factor of two. Where the R vector is represented as R(0), R(1), ... R(n) and a string of eight zeros is represented as 0x00, the unpacked vector is 0x00, R(0), 0x00, R(1), ... 0x00, R(n), with those zeros preceding each pixel's red value.

Operation 306 depicts the step of producing a combined row by summing the top row and the bottom row of each quad, wherein each pixel in each row has a saturation value, and setting the sum of the pixel in the top row summed with the pixel in the bottom row to the saturation value when the sum of the pixel in the top row summed with the pixel in the bottom row exceeds the saturation value. That is, where each channel of a pixel comprises 8 bits of information, and the value of that channel is expressed as an 8-bit unsigned integer, the maximum value that channel may have is $2^8-1$, or 255. That 255 is the saturation value in this example, since no larger value may be stored. Where two numbers are summed such that the sum exceeds 255, the sum will be set to 255. So, while the sum of 100 and 150 will result in the combined row having a value of 250, the sum of 100 and 250 which would normally be 350, will be limited to the saturation value and the combined row will have a value of 255. This operation may comprise part of subsampling an image, along with operations 234-238.

Operation 308 depicts the step of summing the combined row of each quad with a word-shuffled version of the combined row of that quad. Where the row may be expressed as pixel values 0, 1, 2, 3, from left to right, the first two values are switched and the last two values are switched, producing a row of 1, 0, 3, 2. This is then added to the original row producing a row with values of 0+1, 1+0, 2+3, 3+2. Now, the first two values are equal to each other and the second two values are equal to each other, so they may be disregarded, as redundant.

Operation 310 depicts the step of divide the summed and combined row of each quad by four. In an embodiment, this is accomplished by arithmetically shifting the row two places to the right/. In an embodiment, this is performed on 128-bits of each vector at a time, with the shift separately occurring on four 32-bit portions of the 128-bit string, similar to the discussion of arithmetic shifting above. In dividing by four, the average value of the quad is determined. In using the average value, lossy compression is achieved. Precision is decreased by a factor of four, but only one-fourth as many values must be stored compared with before, as one value is stored that corresponds to all four pixels in the quad. In an embodiment, the now redundant values in the quad are discarded.

Operation 312 depicts the step of repack the summed and combined row of each quad. In an embodiment, this is the sibling of the unpack operation—it discards those groups of eight zeros that were introduced during that unpack operation.

Sample Code

The following comprises sample pseudo-code in a high level programming language C-type syntax that, when executed on a vector processor will operate on a source image "srcImage" in the manner of an embodiment of the present disclosure, similar to as described in the detailed description of FIG. 2.

```
ULONG
NSTestCompress(
              NSBitmap&    srcImage,
              PBYTE        pOutputBuf,
              ULONG        cbMaxOutbufSize,
              PBYTE        pYBuffer,
              PBYTE        pCoBuffer,
              PBYTE        pCgBuffer,
              ULONG        cbPlaneOutputSize,
              PBYTE        pWorkBuf,
              ULONG        cbWorkBuf)
{
    BOOL bSubSample = NS_SUBSAMPLE;
    // We operate 4 pixels at a time
    //
    //   P0 = R0G0B0A0
    //   P1 = R1G1B1A1
    //   P2 = R2G2B2A2
```

```
//    P3 = R3G3B3A3
//
//    First we planarize as follows using CPU
//    Rn = R0R1R2R3
//    Gn = G0G1G2G3
//    Gn
//
//
//
// 16-byte align the output buffer
pYBuffer = (PBYTE)(XROUND_UP_16((ULONG)pYBuffer));
pCoBuffer = (PBYTE)(XROUND_UP_16((ULONG)pCoBuffer));
pCgBuffer = (PBYTE)(XROUND_UP_16((ULONG)pCgBuffer));
PBYTE pYBufferOrig = pYBuffer;
PBYTE pCoBufferOrig = pCoBuffer;
PBYTE pCgBufferOrig = pCgBuffer;
//
// 1) Prep the data by splitting planes
//
PBYTE     pRbuffer, pGbuffer, pBbuffer;
//
// 16-byte align channels for SSE perf
//
ULONG cbColorChannelSpace = XROUND_UP_16(srcImage._height *
srcImage._width);
if (cbColorChannelSpace * 3 > cbWorkBuf) {
    return 0;
}
pRbuffer = pWorkBuf;
pGbuffer = pRbuffer + cbColorChannelSpace;
pBbuffer = pGbuffer + cbColorChannelSpace;
PBYTE pSrcPixel;
PBYTE pEndPixel;
ULONG* pRBufferDWORD = (ULONG*)XROUND_UP_16((ULONG)pRbuffer);
ULONG* pGBufferDWORD = (ULONG*)XROUND_UP_16((ULONG)pGbuffer);
ULONG* pBBufferDWORD = (ULONG*)XROUND_UP_16((ULONG)pBbuffer);
//
// 1) PLANARIZE - EFFICIENT
//
pSrcPixel = srcImage._pImgBits;
pEndPixel = pSrcPixel + srcImage._height* srcImage._stride;
while (pSrcPixel < pEndPixel) {
    *pRBufferDWORD++ = X_MAKE_DWORD(pSrcPixel[0], pSrcPixel[4],
pSrcPixel[8], pSrcPixel[12]);
    *pGBufferDWORD++ = X_MAKE_DWORD(pSrcPixel[1+0], pSrcPixel[1+4],
pSrcPixel[1+8], pSrcPixel[1+12]);
    *pBBufferDWORD++ = X_MAKE_DWORD(pSrcPixel[2+0], pSrcPixel[2+4],
pSrcPixel[2+8], pSrcPixel[2+12]);
    pSrcPixel+=16;
}
//
// 2 Compute Y Coefficients
//
_m128i xmmZero = _mm_setzero_si128( );
_m128i xmmRvect, xmmGvect, xmmBvect;
_m128i xmmYFirstQWORD, xmmCoFirstQWORD;
    PBYTE pRbufferReader = pRbuffer;
    PBYTE pGbufferReader = pGbuffer;
    PBYTE pBbufferReader = pBbuffer;
    PBYTE pBbufferReaderEnd = (pRbuffer + cbColorChannelSpace);
_m128i xmm1, xmm2, xmm3, xmmCo, xmmY, xmmCg;
_m128i xmmCo2, xmmY2, xmmCg2;
_m128i xmmChromaMask = _mm_set_epi16(0x1ff >> X_COLOR_LOSS_LEVEL,
0x1ff >> X_COLOR_LOSS_LEVEL,
0x1ff >> X_COLOR_LOSS_LEVEL,
0x1ff >> X_COLOR_LOSS_LEVEL,
0x1ff >> X_COLOR_LOSS_LEVEL,
0x1ff >> X_COLOR_LOSS_LEVEL,
0x1ff >> X_COLOR_LOSS_LEVEL,
0x1ff >> X_COLOR_LOSS_LEVEL);
    while (pRbufferReader < pBbufferReaderEnd) {
        //
        // ~~~~~~~~~~~~~~~~~~~~~~~~~~~~~~~~~~~
        // First 64-bits in parallel
        //
        //
        // Read color vectors
        //
        xmmRvect = _mm_loadl_epi64((_m128i*)pRbufferReader);
        xmmGvect = _mm_loadl_epi64((_m128i*)pGbufferReader);
```

```
xmmBvect = _mm_loadl_epi64((__m128i*)pBbufferReader);
pRbufferReader += 8;
pGbufferReader += 8;
pBbufferReader += 8;
// unpack to R 0 G 0 B 0 (16 bits per channel to make math per
//16 bit possible)
xmmRvect = _mm_unpacklo_epi8(xmmRvect, xmmZero);
xmmGvect = _mm_unpacklo_epi8(xmmGvect, xmmZero);
xmmBvect = _mm_unpacklo_epi8(xmmBvect, xmmZero);           i
//   NOTE 3
//      co = r - b;
//      y = b + (co >> 1);
//      cg = g - y;
//      y += (cg >> 1);
xmmCo   = _mm_subs_epi16(xmmRvect, xmmBvect);     // co = R - B
xmm1    = _mm_srai_epi16(xmmCo, 1);               // co >> 1
xmmY    = _mm_adds_epi16(xmmBvect, xmm1);         // y = b + co >> 1
xmmCg   = _mm_subs_epi16(xmmGvect, xmmY);         // cg = g - y
xmm1    = _mm_srai_epi16(xmmCg, 1);               // cg >> 1
xmmY    = _mm_adds_epi16(xmmY, xmm1);             // y += cg >> 1
// Now do masks on Co and Cg
xmmCo = _mm_srai_epi16(xmmCo, X_COLOR_LOSS_LEVEL);
xmmCo = _mm_and_si128(xmmCo, xmmChromaMask);
xmmCg = _mm_srai_epi16(xmmCg, X_COLOR_LOSS_LEVEL);
xmmCg = _mm_and_si128(xmmCg, xmmChromaMask);
//
//~~~~~~~~~~~~~~~~~~~~~~~~~~~~~~~~~~~~
// Second 64-bits
//
//
// Read color vectors
//
xmmRvect = _mm_loadl_epi64((__m128i*)pRbufferReader);
xmmGvect = _mm_loadl_epi64((__m128i*)pGbufferReader);
xmmBvect = _mm_loadl_epi64((__m128i*)pBbufferReader);
pRbufferReader += 8;
pGbufferReader += 8;
pBbufferReader += 8;
// unpack to R 0 G 0 B 0 (16 bits per channel to make math per
//16 bit possible)
xmmRvect = _mm_unpacklo_epi8(xmmRvect, xmmZero);
xmmGvect = _mm_unpacklo_epi8(xmmGvect, xmmZero);
xmmBvect = _mm_unpacklo_epi8(xmmBvect, xmmZero);
//
//      co = r - b;
//      y = b + (co >> 1);
//      cg = g - y;
//      y += (cg >> 1);
xmmCo2  = _mm_subs_epi16(xmmRvect, xmmBvect);     // co = R - B
xmm1    = _mm_srai_epi16(xmmCo2, 1);              // co >> 1
xmmY2   = _mm_adds_epi16(xmmBvect, xmm1);         // y = b + co >> 1
xmmCg2  = _mm_subs_epi16(xmmGvect, xmmY2);        // cg = g - y
xmm1    = _mm_srai_epi16(xmmCg2, 1);              // cg >> 1
xmmY2   = _mm_adds_epi16(xmmY2, xmm1);            // y += cg >> 1
// Now do masks on Co and Cg
xmmCo2 = _mm_srai_epi16(xmmCo2, X_COLOR_LOSS_LEVEL);
xmmCo2 = _mm_and_si128(xmmCo2, xmmChromaMask);
xmmCg2 = _mm_srai_epi16(xmmCg2, X_COLOR_LOSS_LEVEL);
xmmCg2 = _mm_and_si128(xmmCg2, xmmChromaMask);
//
// Now do storage
//
// Y component - pack into 16-bytes
xmmY = _mm_packs_epi16(xmmY, xmmY2);
_mm_store_si128((__m128i*)pYBuffer, xmmY);    //stores in one shot
pYBuffer += 16;
// Co component - pack into 16-bytes
xmmCo = _mm_packs_epi16(xmmCo, xmmCo2);
_mm_store_si128((__m128i*)pCoBuffer, xmmCo);
pCoBuffer += 16;
// Cg component - pack into 16-bytes
xmmCg = _mm_packs_epi16(xmmCg, xmmCg2);
_mm_store_si128((__m128i*)pCgBuffer, xmmCg);
pCgBuffer += 16;
}
//
// Now do the ACRUSH magic on each channel!;
//
```

-continued

```
    ULONG retVal;
    if (!g_pACContext) {
        g_cbACContextSize =
RDPCompress_GetContextSize(PACKET_COMPR_TYPE_ACRUSH);
        g_pACContext = malloc(g_cbACContextSize);
        RDPCompress_InitSendContext(g_pACContext, g_cbACContextSize,
PACKET_COMPR_TYPE_ACRUSH);
    }
    ULONG       cbCompressedSize;
    ULONG       cbOrigSize;
    //
    // Do Y Channel
    //
    cbCompressedSize = cbColorChannelSpace;
    ULONG       cbOutSizeTotal = 0;
    PBYTE          pCurWriteOutput = pOutputBuf;
    //
    // ~~~~~~~~~~~~~~~~~ Y component ~~~~~~~~~~~~~
    //
    retVal = XRDPCompress(PACKET_COMPR_TYPE_ACRUSH,
                                         pYBufferOrig,
                                         pCurWriteOutput,
                                         &cbCompressedSize,
                                         g_pACContext);
///     printf("Y: run=%d compr=%d\n", cbRunLength, cbCompressedSize);
    if (retVal & PACKET_COMPRESSED) {
        cbOutSizeTotal += cbCompressedSize;
    }
    else {
        memcpy(pCurWriteOutput, pYBufferOrig, cbColorChannelSpace);
        cbOutSizeTotal += cbColorChannelSpace;
    }
    pCurWriteOutput += cbOutSizeTotal;
    //
    // ~~~~~~~~~~~~~~~~~ Co component ~~~~~~~~~~~~~
    //
    //
    // Downsample CO
    //
    if (bSubSample) {
        ULONG cbSubSampleSize;
        cbSubSampleSize = NSSubSample2xColorChannelSSE(pCoBufferOrig,
cbColorChannelSpace, srcImage._width, srcImage._height,
                                                      pWorkBuf,
cbWorkBuf);
        pCoBufferOrig = pWorkBuf;
        cbCompressedSize = cbSubSampleSize;
    }
    else {
        cbCompressedSize = cbColorChannelSpace;
    }
    retVal = XRDPCompress(PACKET_COMPR_TYPE_ACRUSH,
                                         pCoBufferOrig,
                                         pCurWriteOutput,
                                         &cbCompressedSize,
                                         g_pACContext);
    if (retVal & PACKET_COMPRESSED) {
        cbOutSizeTotal += cbCompressedSize;
    }
    else {
        memcpy(pCurWriteOutput, pCoBufferOrig, cbColorChannelSpace);
        cbOutSizeTotal += cbColorChannelSpace;
    }
    pCurWriteOutput += cbCompressedSize;
    //
    // ~~~~~~~~~~~~~~~~~ Cg component ~~~~~~~~~~~~~  //exactly same as
Co
    //
    // Downsample CO
    //
    if (bSubSample) {
        ULONG cbSubSampleSize;
        cbSubSampleSize = NSSubSample2xColorChannelSSE(pCgBufferOrig,
cbColorChannelSpace, srcImage._width, srcImage._height,
                                                      pWorkBuf,
cbWorkBuf);
        pCgBufferOrig = pWorkBuf;
        cbCompressedSize = cbSubSampleSize;
    }
```

```
        else {
            cbCompressedSize = cbColorChannelSpace;
        }
        retVal = XRDPCompress(PACKET_COMPR_TYPE_ACRUSH,
                                            pCgBufferOrig,
                                            pCurWriteOutput,
                                            &cbCompressedSize,
                                            g_pACContext);
        if (retVal & PACKET_COMPRESSED) {
            cbOutSizeTotal += cbCompressedSize;
        }
        else {
            memcpy(pCurWriteOutput, pCgBufferOrig, cbColorChannelSpace);
            cbOutSizeTotal += cbColorChannelSpace;
        }
        pCurWriteOutput += cbCompressedSize;
        return cbOutSizeTotal;
}
```

The following comprises sample pseudo-code in a high level programming language C-type syntax that, when executed on a vector processor will operate on an image as defined by the parameters to NSSubSample2xColorChannelSSE( ) in the manner of an embodiment of the present disclosure, similar to as described in the detailed description of FIG. 3.

```
ULONG
NSSubSample2xColorChannelSSE(
            PBYTE       pSrcBytes,
            ULONG       cbLength,
            ULONG       width,
            ULONG       height,
            PBYTE       pOutputBytes,
            ULONG       cbMaxOutputLen
            )
{
    PBYTE   pEndData      = pSrcBytes + width*height;
    _m128i xmmZero = _mm_setzero_si128( );
    ULONG*  pOutputWriter = (ULONG*)pOutputBytes;
    //
    // Fix fix no uniform row
    //
    for (ULONG i=0; i<height-1; i++) {
        PBYTE   pCurrentRow = pSrcBytes + width * i;
        PBYTE   pRowEnd = pCurrentRow + width;
        _m128i  srcDataRow0;
        _m128i  xmm1;
        _m128i  srcDataRow1;
        while (pCurrentRow < pRowEnd) {
            srcDataRow0 = _mm_loadl_epi64((_m128i*)pCurrentRow);
            srcDataRow1 =
_mm_loadl_epi64((_m128i*)(pCurrentRow+width));
            pCurrentRow += 8;
            //
            // Unpack to 16-bit values
            //
            srcDataRow0 = _mm_unpacklo_epi8(srcDataRow0, xmmZero);
            srcDataRow1 = _mm_unpacklo_epi8(srcDataRow1, xmmZero);
            //
            // Add with saturate row1+row2
            //
            srcDataRow0 = _mm_adds_epi16(srcDataRow0, srcDataRow1);
            //
            //make a copy shuffled to swap each WORD
            //
            xmm1 = _mm_shufflehi_epi16(srcDataRow0,
_MM_SHUFFLE(2,3,0,1));
            xmm1 = _mm_shufflelo_epi16(srcDataRow0,
_MM_SHUFFLE(2,3,0,1));
            //
            // Now add the alternating cols
            //
            xmm1 = _mm_adds_epi16(xmm1, srcDataRow0);
```

```
            xmm1 = _mm_srai_epi16(xmm1, 2);
            xmm1 = _mm_shufflehi_epi16(xmm1, _MM_SHUFFLE(3,1,2,0));
                xmm1 = _mm_shufflelo_epi16(xmm1, _MM_SHUFFLE(3,1,2,0));
            // bring together the unique values in the 2-LOW DWORDS
            xmm1 = _mm_shuffle_epi32(xmm1, _MM_SHUFFLE(3,1,2,0));
            //
            // We now have
            //        (P00+P01+P10+P11) (P00+P01+P10+P11)
            //        (P02+P03+P12+P13)(P02+P03+P12+P13)
            // net every other 16-bit value is redundant - pack away now
            //
            xmm1 = _mm_packs_epi16(xmm1, xmmZero);
            // low 4 bytes are the averages we want
            *pOutputWriter++ = *((ULONG*)&xmm1);
        }
    }
    return       cbLength / 4;
}
```

What is claimed:

1. A method for compressing a source image for compressing a source image comprising pixels, each pixel comprising red-green-blue (RGB) image data, on a processor that supports vector processing comprising:
 planarizing the image into its R, G and B components by sending a series of processor instructions to the processor, each processor instruction operating on data plurality of pixels simultaneously;
 converting the planarized image into luminance-orange-green (YCoCg) image data by sending a series of processor instructions to the processor, each processor instruction operating on data plurality of pixels simultaneously;
 compressing the Co and Cg components of the YCoCg image by sending a series of processor instructions to the processor each processor instruction operating on data plurality of pixels simultaneously; and
 storing the compressed image data.

2. The method of claim 1, further comprising:
 subsampling the Co and Cg components of the compressed image data.

3. The method of claim 2, wherein subsampling comprises:
 segmenting the compressed image data into at least one quad, a quad comprising four pixels, such that each pixel in the quad shares a column of the compressed image data with one other pixel in the quad, and each pixel in the quad shares a row of the compressed image data with one other pixel in the quad, each quad having a top row and a bottom row, and that a pixel corresponds to at most one quad;
 unpacking each row of each quad;
 producing a combined row by summing the top row and the bottom row of each quad, wherein each pixel in each row has a saturation value, and setting the sum of the pixel in the top row summed with the pixel in the bottom row to the saturation value when the sum of the pixel in the top row summed with the pixel in the bottom row exceeds the saturation value;
 summing the combined row of each quad with a word-shuffled version of the combined row of that quad;
 dividing the summed and combined row of each quad by four;
 and repacking the summed and combined row of each quad.

4. The method of claim 1, wherein, a pixel comprises four channels of eight bits each.

5. The method of claim 1, wherein the Y component corresponds to a luminance of the source image, the Co component corresponds to an orange of the source image, and the Cg component corresponds to a green of the source image.

6. The method of claim 1, further comprising:
 sending the compressed image data over a network via a remote desktop protocol (RDP) protocol.

7. The method of claim 1, wherein planarizing the image comprises:
 inserting a sequence of eight zeros before each eight bits of the R, G, and B components.

8. The method of claim 1, wherein each channel of a pixel comprises eight bits and aligning each channel of the source image comprises 16-bit aligning each channel.

9. The method of claim 1, wherein the processor is configured to operate on 128 bits simultaneously.

10. The method of claim 1, wherein at least one of the operations of planarizing, converting and storing comprises:
 sending a SIMD instruction to the processor to operate upon at least one channel each of a plurality of pixels simultaneously.

11. The method of claim 1, wherein setting a Y vector to equal the sum of the B vector Co vector arithmetically divided by two comprises:
 arithmetically bitwise shifting the Co vector once to the right.

12. The method of claim 1, wherein storing the compressed image data comprises:
 de-planarizing the Y component, the Co component and the Cg component.

13. The method of claim 1, wherein the source image corresponds to a displayed user session.

14. The method of claim 1, wherein at least one of the source image and the compressed image data comprises a bitmap image.

15. The method of claim 1, wherein compressing the Co and Cg components comprises:
 compressing the Co and Cg components with a color loss level that corresponds to an amount to compress the image.

16. The method of claim 1, compressing the Co and Cg components comprises:
 run-length encoding in accordance with a Lempel-Ziv (LZ) algorithm.

17. The method of claim 1, wherein compressing the Co and Cg components comprises:
 compressing the Co and Cg components with a chroma mask, the chroma mask comprising a sequence of binary ones equal to the number of bits that the processor may operate on simultaneously, arithmetically bit shifted to the right by a color loss level in groups of bits that correspond to twice a number of bits in a pixel's red value.

18. A system for compressing a source image on a processor that supports vector processing, comprising:
 a processor; and
 a memory communicatively coupled to the processor when the system is operational, the memory bearing processor executable instructions that, when executed on the processor, cause the system to at least:
  receive the source image comprising pixels, each pixel comprising red-green-blue (RGB) image data;
  planarize the image into its R, G and B components by sending a series of processor instructions to the processor, each processor instruction operating on data plurality of pixels simultaneously;
  convert the planarized image into luminance-orange-green (YCoCg) image data by sending a series of processor instructions to the processor, each processor instruction operating on data plurality of pixels simultaneously;
  compress the Co and Cg components of the YCoCg image by sending a series of processor instructions to the processor, each processor instruction operating on data plurality of pixels simultaneously; and
  store the compressed image data.

19. The system of claim 18, wherein the memory further bears processor-executable instructions that, when executed on the processor, cause the system to at least:
 divide the compressed image data into at least one group of four pixels and subsampling each group of four pixels.

20. A computer-readable storage medium excluding signals for compressing a source image comprising pixels, on a processor that supports vector processing, comprising computer-readable instructions that, when executed upon a computer, cause the computer to perform operations comprising:
 planarizing the image into its component colors by sending a series of processor instructions to the processor, each processor instruction operating on data plurality of pixels simultaneously;
 converting the planarized image into image data in a second colorspace by sending a series of processor instructions to the processor, each processor instruction operating on data plurality of pixels simultaneously;
 compressing a component of the image data in the second colorspace by sending a series of processor instructions to the processor, each processor instruction operating on data plurality of pixels simultaneously; and
 storing the compressed image data.

\* \* \* \* \*